United States Patent
Sugimoto et al.

(10) Patent No.: US 10,910,612 B2
(45) Date of Patent: Feb. 2, 2021

(54) BATTERY STORAGE TRAY AND BATTERY PACKAGE

(71) Applicant: SANYO Electric Co., Ltd., Daito (JP)

(72) Inventors: Shuji Sugimoto, Hyogo (JP); Kyosuke Miyata, Osaka (JP); Ryoji Shigemoto, Osaka (JP)

(73) Assignee: SANYO Electric Co., Ltd., Daito (JP)

( * ) Notice: Subject to any disclaimer, the term of this patent is extended or adjusted under 35 U.S.C. 154(b) by 242 days.

(21) Appl. No.: 16/074,673

(22) PCT Filed: Feb. 10, 2017

(86) PCT No.: PCT/JP2017/004861
§ 371 (c)(1),
(2) Date: Aug. 1, 2018

(87) PCT Pub. No.: WO2017/145796
PCT Pub. Date: Aug. 31, 2017

(65) Prior Publication Data
US 2019/0044109 A1    Feb. 7, 2019

(30) Foreign Application Priority Data

Feb. 23, 2016 (JP) .................................. 2016-031536

(51) Int. Cl.
*B65D 85/00* (2006.01)
*H01M 2/10* (2006.01)
(Continued)

(52) U.S. Cl.
CPC ............ *H01M 2/105* (2013.01); *B65D 5/503* (2013.01); *B65D 71/70* (2013.01); *B65D 85/70* (2013.01);
(Continued)

(58) Field of Classification Search
CPC ........ B65D 5/503; B65D 71/70; B65D 85/70; B65D 2585/88; H01M 2/105; H01M 2/1077
(Continued)

(56) References Cited

U.S. PATENT DOCUMENTS 3,321,332 A * 5/1967 Vignini ................. H01M 2/105
                                                                429/1
4,130,200 A * 12/1978 Iepson ................... B65D 71/00
                                                                206/427
(Continued)

FOREIGN PATENT DOCUMENTS

JP           5-3119 U      1/1993
JP      2000-353507 A     12/2000
(Continued)

OTHER PUBLICATIONS

International Search Report dated Feb. 10, 2017, issued in counterpart International Application No. PCT/JP2017/004861 (2 pages).

*Primary Examiner* — Luan K Bui
(74) *Attorney, Agent, or Firm* — Westerman, Hattori, Daniels & Adrian, LLP

(57) ABSTRACT

A battery storage tray according to an aspect of the present invention includes a first pocket portion into which a first end portion of a columnar battery in a longitudinal direction is inserted. The first pocket portion has a cup shape including an opening, a side portion, and a bottom portion. The side portion of the first pocket portion includes a fitting portion, which fits to the columnar battery, and a groove, which defines a space between the groove and the columnar battery. The space defined by the groove is connected to the opening of the first pocket portion. An aspect of the present invention provides a battery storage tray capable of reliably holding the columnar battery and facilitating removal of the columnar battery.

8 Claims, 4 Drawing Sheets

(51) Int. Cl.
  *B65D 5/50*    (2006.01)
  *B65D 71/70*   (2006.01)
(52) U.S. Cl.
  CPC ....... *H01M 2/1077* (2013.01); *B65D 2585/88* (2013.01)
(58) Field of Classification Search
  USPC ....... 206/564, 703, 705, 722, 723, 725, 728; 220/737, 738, 745
  See application file for complete search history.

(56) References Cited

U.S. PATENT DOCUMENTS

| | | | | |
|---|---|---|---|---|
| 6,419,091 | B1* | 7/2002 | Gaffney | B65D 43/162 |
| | | | | 206/701 |
| 7,597,199 | B1* | 10/2009 | Rochelo | A45C 11/00 |
| | | | | 206/703 |
| 2005/0031940 | A1* | 2/2005 | Chacon | H01M 6/5066 |
| | | | | 429/100 |
| 2010/0330404 | A1 | 12/2010 | Nishino et al. | |
| 2014/0166532 | A1* | 6/2014 | Sugimoto | H01M 2/105 |
| | | | | 206/703 |
| 2015/0280180 | A1* | 10/2015 | Ok | H01M 2/105 |
| | | | | 429/99 |
| 2019/0375571 | A1* | 12/2019 | Schmick | B65D 71/403 |

FOREIGN PATENT DOCUMENTS

| | | | |
|---|---|---|---|
| JP | 2003-142057 | A | 5/2003 |
| JP | 2009-193691 | A | 8/2009 |
| WO | 2013/031194 | A1 | 3/2013 |

\* cited by examiner

BATTERY STORAGE TRAY AND BATTERY PACKAGE

TECHNICAL FIELD

The present invention relates to a battery tray enabling reliable fastening of batteries and smooth removal of the batteries, and a battery package including the battery tray.

BACKGROUND ART

Secondary batteries such as nonaqueous electrolyte secondary batteries and nickel-metal hydride batteries can be repeatedly charged and discharged, and are thus economical and highly suitable to the environment. Secondary batteries thus have a large demand. Particularly, nonaqueous electrolyte secondary batteries, which are lightweight and have high energy density, have been widely used for, for example, a power supply for driving a small electronic device such as a smartphone and tablet computer. The field of application of nonaqueous electrolyte secondary batteries has also been expanded to, for example, power tools, power assisted bicycles, electric vehicles, and power storage systems.

Nonaqueous electrolyte secondary batteries are roughly grouped into cylindrical batteries, prismatic batteries, and pouch batteries depending on the shape or material of their exterior bodies. Cylindrical batteries and prismatic batteries include a metal-made, tubular external can, and thus can be collectively called columnar batteries.

Columnar batteries are suitable for use as a battery pack including a large number of batteries connected in series or in parallel. A battery pack is often assembled at the destination to which batteries have been delivered. Batteries that have been packed for delivery need unpacking to be taken out and introduced into the process of manufacturing a battery pack.

PTLs 1 and 2 disclose packing boxes for cylindrical batteries, in which cylindrical batteries are packed in a packing box while having their longitudinal direction extending in the vertical direction. In PTL 2, partitioning plates forming a honeycomb structure to separate batteries from each other are placed in a packing box, and the batteries are inserted in hexagonal tube portions. The size of the tube portions is changeable by crushing the partitioning plates from the sides. The partitioning plates thus do not need to be replaced with other ones according to the size of the batteries.

PTL 3 discloses a battery packing structure for housing cylindrical batteries in an accommodation casing while two trays each having pocket portions are placed on the top and bottom of the batteries. This packing structure fixes the batteries in the pocket portions, and prevents the batteries from touching each other during transport. The pockets have spaces at their bottom portions to prevent corners of the batteries from touching the bottom portions. Thus, the batteries are prevented from being damaged during transport.

CITATION LIST

Patent Literature

PTL 1: Japanese Published Unexamined Patent Application No. 2009-193691
PTL 2: Japanese Unexamined Utility Model Registration Application Publication No. 5-3119
PTL 3: International Publication No. WO2013/031194

SUMMARY OF INVENTION

Technical Problem

The packing box disclosed in PTL 1 does not include a device for fastening the batteries, and thus the positions of the batteries become unstable in the packing box. This structure hinders automation of a process of removing batteries from the packing box. The packing box disclosed in PTL 2 includes partitioning plates deformable in accordance with the battery size, and thus reliably fixes the batteries in position in the packing box. The packing box, however, is not suitable for automating the process for removing the batteries.

In the battery packing structure disclosed in PTL 3, on the other hand, the batteries are removed from the battery storage trays, instead of from the battery packing box. This packing structure is thus suitable for automating the process for removing the batteries. However, the pocket portions having the inner diameter reduced to enhance the performance of the battery storage trays for holding the batteries would raise the airtightness between the inner surfaces of the pocket portions and the outer surfaces of the batteries. This structure would thus hinder removal of the batteries from the pocket portions due to a lowered atmospheric pressure in an area defined by the inner surface of each pocket portion and the outer surface of the corresponding battery. Specifically, the enhancement of the performance of the battery storage trays for holding the batteries and the improvement for smooth removal of the batteries are incompatible. How to make a trade-off between these is an issue.

The present invention, has been made to address the above problem, and aims to provide a battery storage tray capable of reliably holding batteries and facilitating removal of the batteries, and a battery package including the battery storage tray.

Solution to Problem

To address the above problem, a battery storage tray according to an aspect of the present invention includes a first pocket portion into which a first end portion of a columnar battery in a longitudinal direction is inserted. The first pocket portion has a cup shape including an opening, a side portion, and a bottom portion. The side portion of the first pocket portion includes a fitting portion, which fits to the columnar battery, and a groove, which defines a space between the groove and the columnar battery. The space defined by the groove is connected to the opening of the first pocket portion.

Preferably, the side portion of the first pocket portion includes a taper portion in which the first pocket portion tapers inward from an end portion at the opening toward the bottom portion.

A battery package according to an aspect of the present invention includes a first battery storage tray disposed at a first end portion of the columnar battery in a longitudinal direction; a second battery storage tray disposed at a second end portion of the columnar battery in the longitudinal direction; an inner carton including an outer frame that surrounds outer peripheral portions of the first and second battery storage trays, the inner carton including a bottom plate; and an outer carton having a box shape and housing the inner carton. The battery storage tray according to an aspect of the above-described present invention serves as the first battery storage tray. Preferably, the first battery storage tray includes, at an outer peripheral portion, a protrusion that protrudes toward an outer periphery. The second battery storage tray includes a second pocket portion into which a second end portion of the columnar battery in the longitudinal direction is inserted. The outer frame of the inner carton includes a recess or a through hole into which the protrusion included in the first battery storage tray is inserted.

Advantageous Effects of Invention

According to an aspect of the present invention, the side portion of the first pocket portion in the battery storage tray is capable of reliably holding a battery. The groove formed in the side portion of the first pocket portion defines a space between the battery and the side portion, and thus facilitates removal of the battery. An aspect of the present invention can thus provide a battery storage tray capable of reliably holding batteries and facilitating removal of the batteries, and a battery package including the battery storage tray.

DESCRIPTION OF EMBODIMENTS

A battery storage tray and a battery package according to an embodiment of the present invention are described below in detail with reference to the drawings. A cylindrical battery is used as an example of a columnar battery housed in the battery storage tray.

A cylindrical battery includes a metal-made, bottomed cylindrical outer can. The outer can has an opening at which a sealing member is caulked with a gasket interposed therebetween. The sealing member has a cap-shaped positive terminal at its center portion. The cylindrical battery thus has a flat bottom portion and a cap-shaped top portion. The present embodiment describes an example of a battery storage tray that houses a bottom portion of a battery.

Battery Storage Tray

Figure 1:
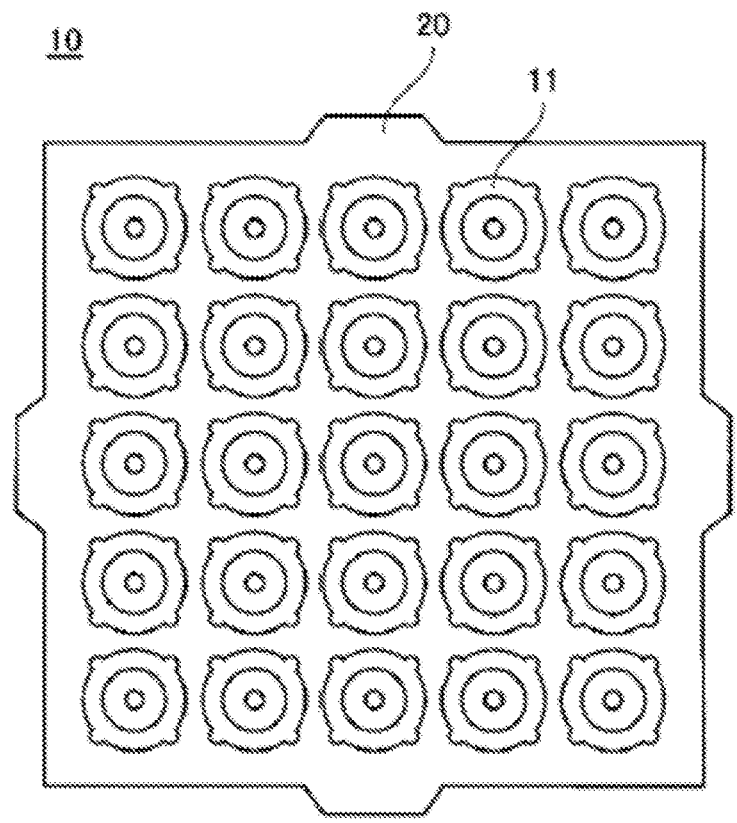
FIG. 1 is a plan view of a battery storage tray.

As illustrated in FIG. 1, a battery storage tray 10 according to an embodiment of the present invention includes cup-shaped first pocket portions 11 into which batteries 40 are inserted. In the present embodiment, the first pocket portions 11 are arranged in five rows and five columns in the battery storage tray 10. However, the arrangement of the first pocket portions 11 may be appropriately determined. Preferably, the battery storage tray 10 is rectangular in at plan. The battery storage tray 10 has protrusions 20 that protrude toward an outer periphery at the outer peripheral portion. The protrusions 20 are not necessarily needed. The number or arrangement of the protrusions 20 is not limited to a particular one. However, providing the protrusions 20 is preferable in terms of facilitating portability of the battery storage tray 10 or housing and fixing of the battery storage tray 10 in a packing box.

Figure 2:
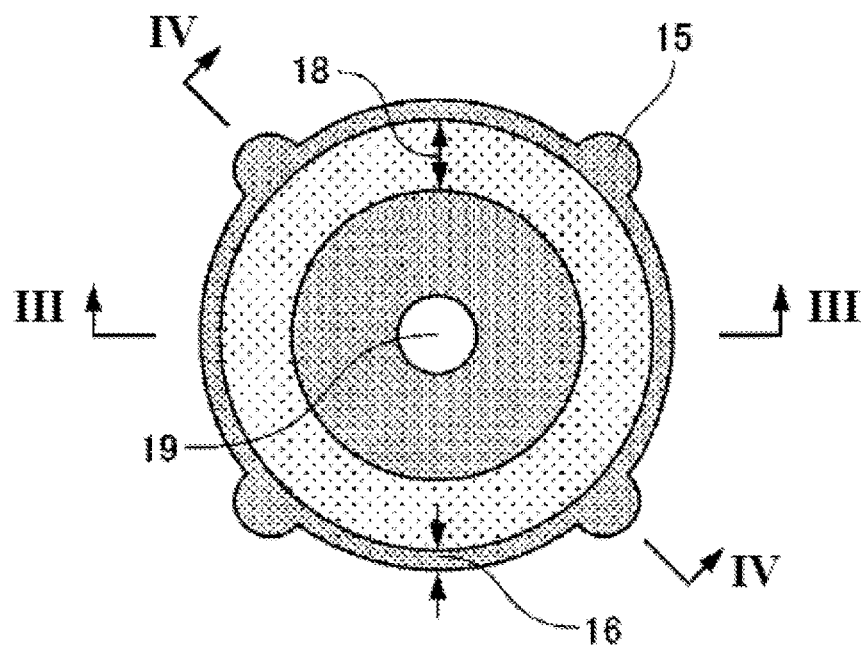
FIG. 2 is a plan view of a pocket portion included in a battery storage tray.
Figure 3:
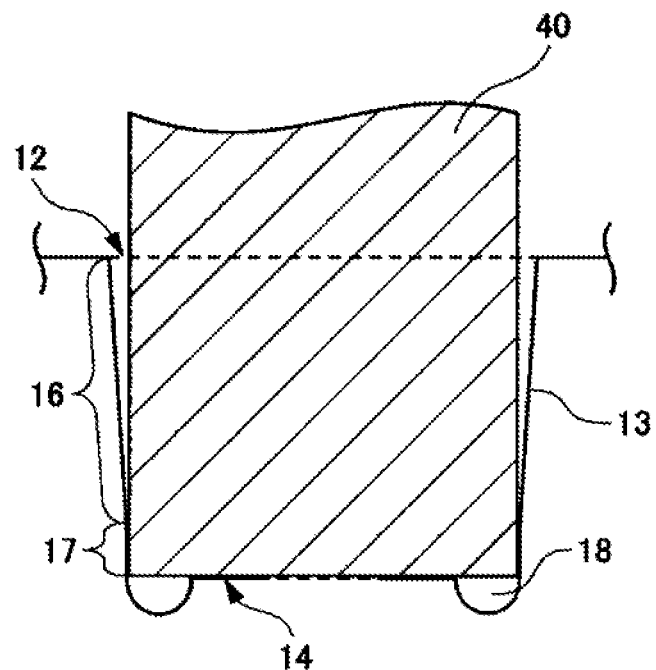
FIG. 3 is a sectional view of the pocket portion taken along line III-III of FIG. 2 into which a battery is inserted.

As illustrated in FIGS. 2 and 3, the first pocket portion 11 includes an opening 12, a side portion 13, and a bottom portion 14. The side portion 13 includes grooves 15, a taper portion 16, and a fitting portion 17. The bottom portion 14 includes a through hole 19 and a bulge portion 18. Among these portions, the grooves 15 and the fitting portion 17 are essential for the present invention, and others are optional.

Figure 4:
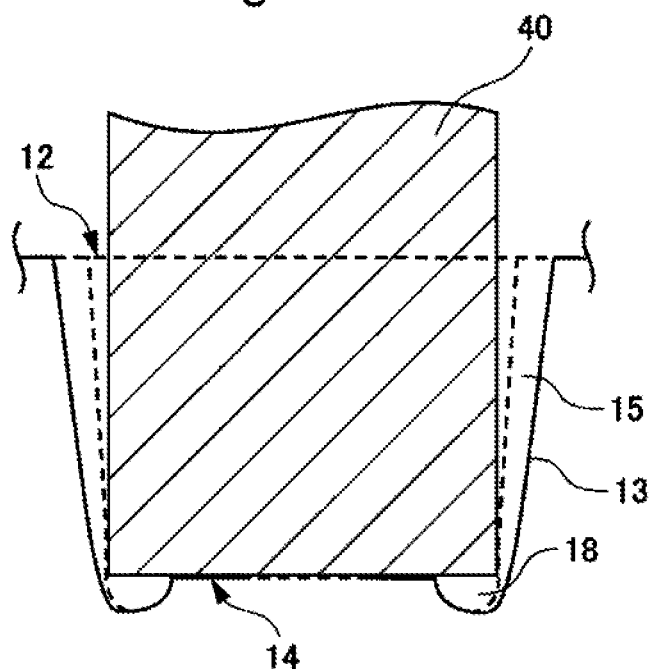
FIG. 4 is a sectional view of the pocket portion taken along line IV-IV of FIG. 2 into which a battery is inserted.
Figure 5:
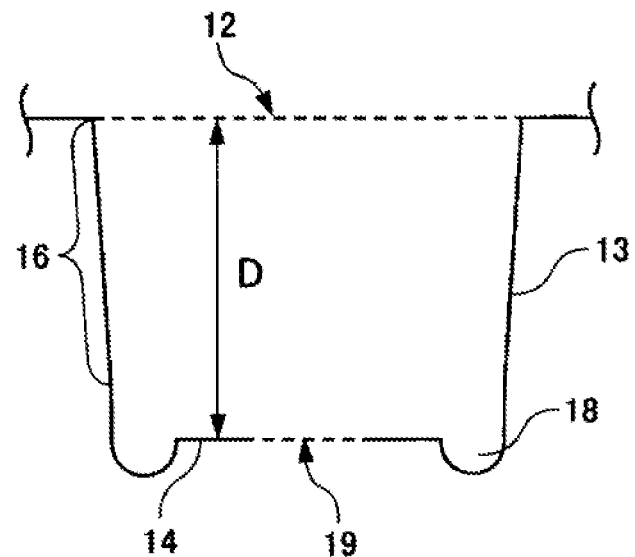
FIG. 5 is a sectional view of the pocket portion taken along line III-III of FIG. 2.

FIGS. 3 and 4 are sectional views respectively taken along lines III-III and IV-IV in FIG. 2. FIGS. 3 and 4 illustrate sections of one battery 40 inserted into the corresponding first pocket portion 11. The taper portion 16 reduces the inner diameter of the first pocket portion 11 from the end of the side portion 13 at the opening 12 toward the bottom portion 14. The taper portion 16 does not fit to the battery 40. The portion excluding the taper portion 16 forms the fitting portion 17 that fits to the battery 40. As illustrated in FIG. 4, the grooves 15 are formed in the side portion 13 to extend from the end at the opening 12 toward the end at the bottom portion 14. The grooves 15 thus reduce the airtightness between the fitting portion 17 and the battery 40 to facilitate removal of the battery 40.

The grooves 15 may extend from the end of the side portion 13 at the opening 12 to some point of the fitting portion 17. The grooves 15 extending to at least some point of the fitting portion 17 reduce the airtightness between the side portion 13 and the battery 40 to facilitate removal of the battery. Here, the grooves 15 preferably extend from the end of the side portion 13 at the opening 12 to a point beyond the height center line of the fitting portion 17. When the side portion 13 has the taper portion 16, the grooves 15 do not have to extend from the fitting portion 17 to the end of the side portion 13 at the opening 12 and may stop at some point of the taper portion 16. In this case, the spaces defined by the grooves 15 between the battery 40 and the side portion 13 are indirectly connected to the opening 12 with the space defined by the taper portion 16 between the battery 40 and the side portion 13.

In the present embodiment, the grooves 15 are straight, but may be curved. The grooves 15 have a U-shaped section when taken perpendicularly to the longitudinal direction, but the section may have another shape such as a V shape. The depth of the grooves 15 may be changed in the longitudinal direction. For example, the depth may be continuously reduced from the opening 12 toward the bottom portion 14. In the present embodiment, four grooves 15 are arranged with point symmetry with respect to the center of the bottom portion 14, but the number or arrangement of the grooves is not limited to a particular one. However, arranging multiple grooves in point symmetry with respect to the center of the bottom portion 14 of each first pocket portion 11 is preferable.

The taper portion 16 included in the side portion 13 enables an increase of the inner diameter of the opening 12 further than the outer diameter of the battery 40. This structure facilitates insertion of the battery 40 into the first pocket portion 11. Thus, including the taper portion 16 in the side portion 13 is preferable. A portion of the side portion 13 needs to fit to the battery 40. The taper portion 16 thus needs to extend to a point within a predetermined range from the end of the side portion 13 at the opening 12. For example, preferably, the taper portion 16 has a depth in the range of greater than or equal to 10% to smaller than or equal to 90% of the depth D of each first pocket portion from the opening 12 of the side portion 13. Here, the depth D of each first pocket portion 11 refers to the distance from the opening 12 to the bottom surface. The bottom surface is a flat portion of the bottom portion 14 excluding the bulge portion and the through hole. When the bottom portion 14 has steps formed by multiple bottom surfaces, a minimum depth D is selected as a reference.

The cone angle of the taper portion 16 is not limited to a particular one. Preferably, the cone angle is 1 to 20 degrees with respect to the depth direction of the first pocket portion 11. The end of the taper portion 16 at the opening 12 may be rounded.

The bulge portion 18 bulges in a direction away from the opening 12 along the outer peripheral edge of the bottom portion 14 of each first pocket portion 11. The bulge portion 18 prevents the corners of the battery 40 from touching the battery storage tray 10. This structure prevents shavings of the battery storage tray 10 from being generated also when the batteries 40 inserted into the first pocket portions 11 receive vibrations during transport.

The through hole 19 is formed at the center portion of the bottom portion 14. A tab connected to the negative plate is joined to the bottom portion of the battery 40 by resistance welding or laser welding. Thus, the bottom portion of the battery 40 may have high surface roughness at the center portion. A through hole is preferably formed to prevent shavings of the battery storage tray 10 from being generated by friction with the center portion of the bottom portion of the battery 40 having high surface roughness. Instead of the through hole 19, a bulge portion may be also disposed at the center portion of the bottom portion 14 as in that provided at the outer peripheral edge. Preferably, the through hole 19 is formed in an area including the center of the bottom portion 14. The shape or size of the through hole 19 may be appropriately determined in accordance with the shape or size of the battery inserted thereinto.

The battery storage tray 10 according to the present embodiment may be manufactured by, for example, vacuum forming with a plastic sheet such as a polyethylene sheet or a polypropylene sheet. The plastic sheet may contain an anticorrosive.

Battery Package

Figure 6:
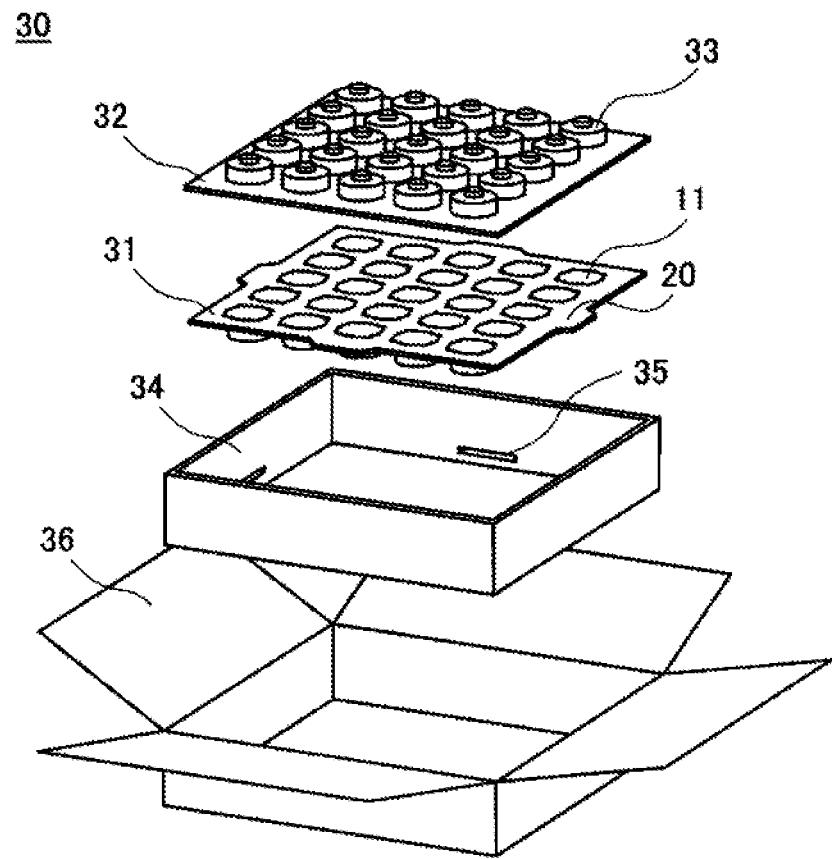
FIG. 6 is a perspective view of components of a battery package.

As illustrated in FIG. 6, a battery package 30 according to the present embodiment includes a first battery storage tray 31, a second battery storage tray 32, an inner carton 34, and an outer carton 36. The first and second battery storage trays 31 and 32 are housed in the inner carton 34 while holding the batteries 40, and the inner carton 34 in this state is then housed in the outer carton 36. The batteries 40 are thus housed in the battery package 30 according to the present embodiment. Hereinbelow, components of the battery package 30 according to the present embodiment are described in detail.

The above-described battery storage tray 10 according to the present embodiment is used as the first battery storage tray 31. To house the batteries 40 in the battery package 30, the bottom portions of the batteries 40 are housed in the first pocket portions 11 of the first battery storage tray 31. In the present embodiment, the first battery storage tray 31 includes the protrusions 20 protruding toward an outer periphery at the outer peripheral portion. These protrusions 20 are used to fix the first battery storage tray 31 in the inner carton 34.

Figure 7:
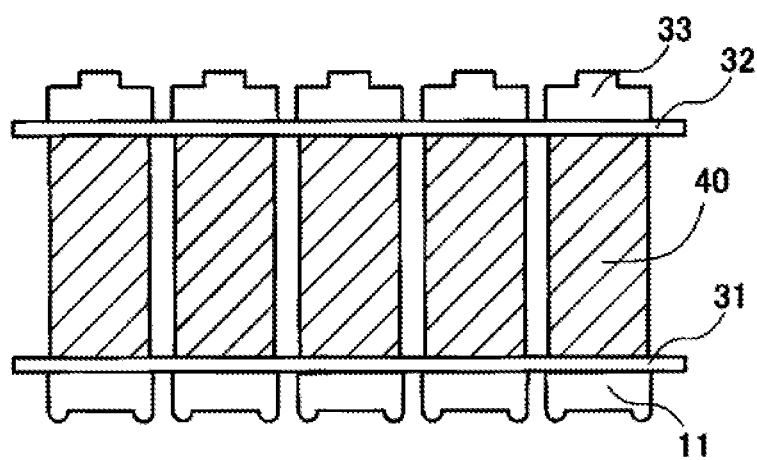
FIG. 7 is a side view of a first battery storage tray and a second battery storage tray, which hold batteries.

The second battery storage tray 32 includes second pocket portions 33 into which top portions of the batteries 40 are inserted. Specifically, both end portions of each battery 40 are respectively inserted into the first and second pocket portions 11 and 33, and the batteries 40 are held between the first and second battery storage trays 31 and 32, in the manner as illustrated in FIG. 7. The batteries 40 are held in the fitting portions 17 of the first battery storage tray 31, and thus the second pocket portions do not need to have fitting portions, as in the first pocket portions 11. Naturally, the second pocket portions 33 may also have fitting portions for fitting the batteries 40. In this case, as in the first pocket portions 11, preferably, the fitting portions preferably have the grooves 15 and the taper portions 16. The second battery storage tray 32 may be manufactured by vacuum forming using a plastic sheet such as a polyethylene sheet or a polypropylene sheet.

The batteries 40 housed in the first and second battery storage trays 31 and 32 are housed in the inner carton 34. The inner carton 34 includes an outer frame that surrounds the outer peripheral portions of the first and second battery storage trays 31 and 32. The inner carton 34 may be manufactured by forming a plastic board or corrugated paperboard. The outer frame of the inner carton 34 has recesses 35. The protrusions 20 of the first battery storage tray 31 are inserted into the recesses 35 to prevent the first and second battery storage trays 31 and 32 from moving in the vertical direction in the inner carton 34. The vertical direction here is a direction in which the first and second battery storage trays 31 and 32 are stacked. As long as allowing the protrusions 20 to be inserted thereinto, the recesses 35 may be replaced with through holes.

Lastly, the inner carton 34 is housed in the outer carton 36 to complete packing of the batteries 40 in the battery package 30. A corrugated box may be used as the outer carton 36.

INDUSTRIAL APPLICABILITY

The present invention can provide a battery storage tray that enables reliable holding of batteries and smooth removal of the batteries, and a battery package including the battery storage tray. The present invention thus has wide industrial applicability.

REFERENCE SIGNS LIST 10 battery storage tray
11 first pocket portion
12 opening
13 side portion
14 bottom portion
15 groove
16 taper portion
17 fitting portion
18 bulge portion
19 through hole
20 protrusion
30 battery package
31 first battery storage tray
32 second battery storage tray
33 second pocket portion
34 inner carton
35 recess
36 outer carton
40 battery

The invention claimed is:

1. A battery storage tray, comprising:
a first pocket portion into which a first end portion of a columnar battery in a longitudinal direction is inserted,
wherein the first pocket portion has a cup shape including an opening, a side portion, and a bottom portion,
wherein the side portion includes a fitting portion, which fits to the columnar battery, and a groove, which defines a space between the groove and the columnar battery,
wherein the space defined by the groove is connected to the opening,
wherein the groove is formed, along a radial direction of the first pocket portion, radially outside from the side portion, and
wherein the groove has a depth thereof continuously reduced from the opening toward the bottom portion.

2. The battery storage tray according to claim 1, wherein the groove extends from an end of the side portion at the opening toward an end of the side portion at the bottom portion.

3. The battery storage tray according to claim 1, wherein the fitting portion includes a taper portion in which the first pocket portion has an inner diameter decreasing from an end portion at the opening toward the bottom portion.

4. The battery storage tray according to claim 3, wherein the taper portion extends from the opening to a point in a range of greater than or equal to 10% to smaller than or equal to 90% of a depth of the first pocket portion, where the depth of the pocket first portion is a minimum distance from the opening to the bottom portion.

5. The battery storage tray according to claim 1, wherein the bottom portion includes a through hole formed in an area including a center of the bottom portion.

6. The battery storage tray according to claim 1, wherein the bottom portion has a bulge portion along an outer peripheral edge of the bottom portion, the bulge portion bulging in a direction away from the opening.

7. The battery storage tray according to claim 1, wherein the battery storage tray includes, at an outer peripheral portion, a protrusion that protrudes toward an outer periphery.

8. A battery package, comprising:
a first battery storage tray disposed at a first end portion of a columnar battery in a longitudinal direction;
a second battery storage tray disposed at a second end portion of the columnar battery in the longitudinal direction;
an inner carton including an outer frame that surrounds outer peripheral portions of the first battery storage tray and the second battery storage tray; and
an outer carton having a box shape and housing the inner carton,
wherein the first battery storage tray comprises:
a first pocket portion into which a first end portion of a columnar battery in a longitudinal direction is inserted,
wherein the first pocket portion has a cup shape including an opening, a side portion, and a bottom portion,
wherein the side portion includes a fitting portion, which fits to the columnar battery, and a groove, which defines a space between the groove and the columnar battery,
wherein the space defined by the groove is connected to the opening, and
wherein the first battery storage tray includes, at an outer peripheral portion, a protrusion that protrudes toward an outer periphery,
wherein the second battery storage tray includes a second pocket portion into which a second end portion of the columnar battery is inserted, and
wherein the outer frame of the inner carton includes a recess or a through hole into which the protrusion is inserted.

* * * * *